Aug. 17, 1965  M. E. HOLMGREN  3,201,154
BRAZED SEAL CONNECTOR
Filed Nov. 29, 1960
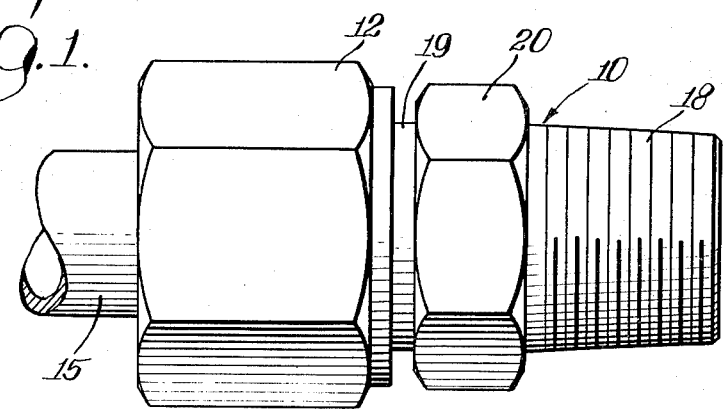
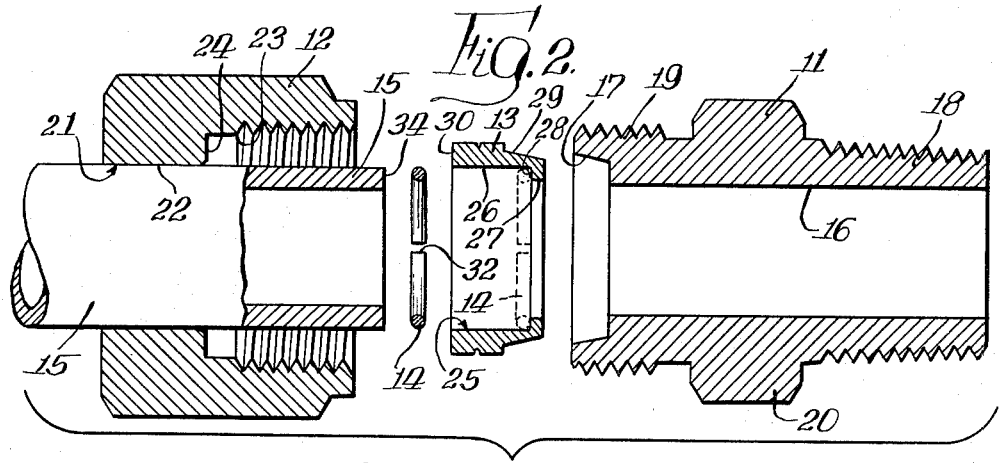
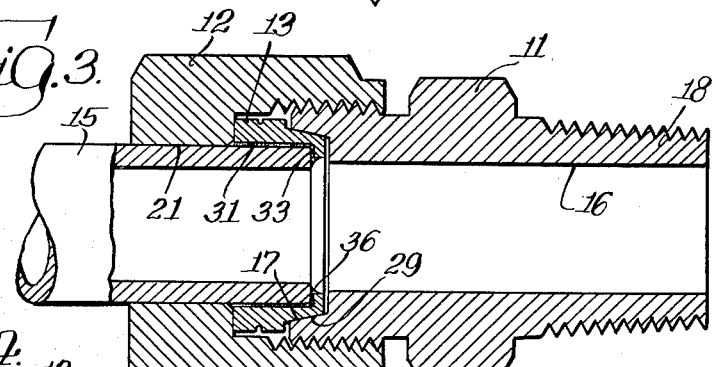
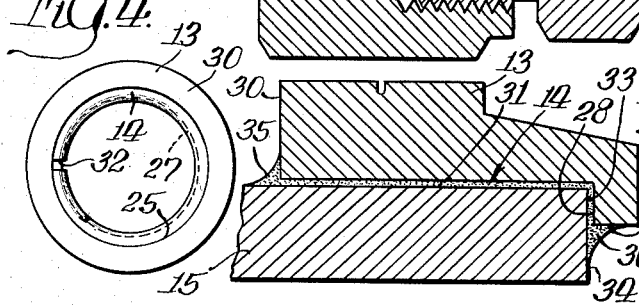
INVENTOR.
Marvin E. Holmgren,

United States Patent Office 3,201,154
Patented Aug. 17, 1965

3,201,154
BRAZED SEAL CONNECTOR
Marvin E. Holmgren, Prospect Heights, Ill., assignor to Imperial-Eastman Corporation, a corporation of Illinois
Filed Nov. 29, 1960, Ser. No. 72,381
2 Claims. (Cl. 285—286)

This invention relates to tube fittings and in particular to tube fittings wherein one end of the tube is brazed to a portion of the fitting.

In known brazed seal fittings, a number of problems occur, limiting the use made thereof. More specifically, in certain of the known brazed seal fittings, the fitting is permanently assembled as a result of the brazing effectively precluding disassembly thereof when desired. Another problem is the need, in a number of such fittings, of substantial longitudinal movement of the tube end during make-up of the fitting, which is a serious problem where the tubing is relatively immovable, as in an installation. Still another problem in known fittings of the brazed seal type is that the person making up the fitting is required to determine the amount of brazing material to utilize therein, often resulting in an excess of the brazing material being used which may become lodged between other sealing surfaces of the fitting and thereby damage the fitting during make-up and permit leakage, or alternatively in too little of the brazing material being used, thereby resulting in an improper brazed seal. Still another disadvantage of the known fittings is the relative complexity thereof and the lack of complete reliability.

The present invention comprehends a new and improved brazed seal fitting which effectively eliminates the above discussed problems. It is a principal object of the present invention, therefore, to provide a new and improved brazed seal fitting.

Another object of the invention is to provide such a fitting wherein a preselected, accurate volume of brazing material is retained in association with the fitting prior to the make-up thereof obviating the need for the person making up the fitting to measure the brazing material.

A further object of the invention is to provide such a fitting wherein the brazing material is resilient and is arranged in an annular configuration for retaining itself within a sleeve portion of the fitting.

Still another object of the invention is to provide such a fitting which may be readily assembled and disassembled.

Another object of the invention is to provide such a fitting wherein effectively minimized longitudinal movement of the tubing is required during make-up of the fitting.

Yet another object of the invention is to provide such a fitting which is extremely simple in construction and reliable in operation.

Other features and advantages of the invention will be apparent from the following description taken in connection with the accompanying drawing wherein:

FIG. 1 is a side elevation of a fitting embodying the invention, with a tube end connected thereto;

FIG. 2 is an exploded diametric section thereof with the preformed brazing material ring shown in dotted lines in its retained position within the fitting sleeve;

FIG. 3 is a diametric section of the made-up fitting;

FIG. 4 is an enlarged fragmentary diametric section of the made-up fitting; and

FIG. 5 is an end view of the sleeve with the brazing material ring installed therein.

In the exemplary embodiment of the invention as disclosed in the drawing, a fitting generally designated 10 is shown to comprise a body member 11, a nut member 12, a sleeve 13, and a ring 14 of brazing material, for use with a tube 15. Ring 14 is retained within sleeve 13 as provided to the user and, thus, the fitting effectively comprises three readily assemblable portions.

More specifically, body 11 comprises a tubular member which may be formed of a metal such as steel, having a bore 16 therethrough defining at its outer end a sealing recess 17, herein defined by a frusto-conical outwardly widening sealing surface. The inner end 18 of the body may be exteriorly threaded for connection to a complementary, female element (not shown) to which the tube 15 is to be coupled. As best seen in FIG. 2, the inner end 19 of the body is exteriorly threaded and the midportion 20 thereof defines a plurality of flats for engagement by a suitable tool such as a wrench.

Nut 12 comprises a generally tubular member formed of a metal such as steel and is provided with a bore 21 therethrough including an outer portion 22, an inner, transversely enlarged portion 23 and an annular radial shoulder 24 therebetween. Inner bore portion 23 is threaded complementarily to body threaded end 19 whereby the nut 12 may be threaded onto body end 19 with bore 21 in coaxial alignment with bore 16 of the body.

The sleeve 13 comprises an annular member formed of a metal such as steel and is provided with a bore 25 therethrough having a cylindrical outer portion 26, a reduced diameter cylindrical inner portion 27, and a radial shoulder 28 therebetween. At its inner end, the sleeve is provided with an external frusto-conical surface 29 arranged to have sealing engagement with the body in recess 17. The outer end 30 of the sleeve defines a planar radial surface arranged to be engaged by the radial shoulder 24 of the nut to urge the surface 29 against the body in recess 17.

The diameter of sleeve bore portion 26 is preferably just slightly larger than the outer diameter of the tube 15 to define a radially thin annular space 31 therebetween through which the fused brazing material will flow by capillary action. Preferably, the radial thickness of the space 31 is approximately .001 to .003 inch. The ring 14 of brazing material is received in the bore portion 26 adjacent the radial shoulder 28. The ring 14 is preferably somewhat resilient and has an unconstricted outer diameter slightly larger than the diameter of the bore portion 26 whereby the ring effectively retains itself in place in bore portion 26. For facilitated retention, the ring may be provided with a gap 32. Illustratively, the ring 14 may be formed of silver brazing alloy material having a wide melting range such as from approximately 1175° F., to approximately 1300° F. The wire diameter of the ring is preferably preselected to define a volume substantially equal to the volume of the annular space 31, the volume of a second annular space 33 between the inner end 34 of the tube 15 and the radial shoulder 28 having an axial length substantially equal to the radial dimension of the space 31, the volume of a preselected concave fillet 35 and the inner end of the sleeve, and approximately 110% of the volume of a preselected concave fillet 36 at the outer end of the tube, so that when the tube end is inserted into the outer portion 26 of the sleeve bore 25 to abut the ring 14 therein and heat is applied to fuse the ring, the ring material flows by capillarity to fully fill the annular space 31 and allows the tube end to be moved into close juxtaposition with the radial shoulder 28 to define the annular space 33. This movement of the sleeve may be effected by tapping the sleeve subsequent to the fusing of the ring 14 or by pressing the tube more fully into the sleeve while holding the sleeve against axial movement. As the brazing material flows to fill the spaces 31 and 33 by capillarity and from the fillets 35 and 36, the focusing of the ring may be effected selectively with the sleeve uppermost, lowermost, or horizontally disposed, as desired or as dictated by the specific environment. As a small variation in the volumes of the spaces 31 and 33 may occur in actual manufacture, as resulting from permitted manufacturing tolerances, the provision of the brazing material in excess of the preselected fillet 36 volume by approximately 10% insures the proper make-up of the fitting with a suitable fillet 36 being formed over the entire range of tolerances.

Prior to the brazing of the sleeve 13 to the tube end, the nut 12 is moved over the tube end as shown in FIG. 2. The sleeve 13 is then installed on the tube end with the tube end surface 34 in abutment with the ring 14, suitable heating of the ring 14 to fuse the same being effected as with a blowtorch. When the ring material is in the free flowing state, it flows into the space 31 by capillary action and permits the sleeve to be moved slightly farther onto the tube end to juxtapose the tube end surface 34 to the radial sleeve surface 28 as shown in FIG. 3. The brazed connection is then allowed to cool and the make-up of the fitting is completed by threading the nut 12 onto the body threaded portion 19 to the arrangement of FIG. 3 wherein the sleeve portion 29 is in sealing engagament with the body in recess 17. As the volume of the brazing material defined by ring 14 is accurately predetermined, a complete seal between the tube end and the sleeve in bore portion 26 is automatically effected without excess brazing material entering the interior of the tube with resultant decrease in the flow passage area. Thus, the tube end is readily and positively sealed to the body 11 in the fitting 10.

Disassembly of the fitting 10 is readily effected merely by unthreading the nut 12 from the body portion 19, permitting the tube end with the sleeve 13 sealingly secured thereto to be removed from the recess 17. Reassembly of the fitting may be effected merely by again threading the nut 12 onto the body portion 19 to re-establish the seal between sleeve portion 29 and body 11 in recess 17.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A tube fitting comprising: a body having a bore therethrough defining at one end a recess having a frusto-conical, outwardly widening sealing surface; a nut having a straight bore for extension of a tube to be coupled therethrough including an outer portion, an inner, transversely enlarged portion, and an annular radial shoulder between said portions, said nut and body having co-operating threads for threading the nut to the body with said nut bore in coaxial alignment with said sealing surface; an annular sealing sleeve coaxially in said inner portion of the nut bore, said sealing sleeve having a bore therethrough including a cylindrical outer portion for receiving the end of a tube to be connected, an inner transversely reduced portion, and an annular radial shoulder between said sleeve bore portions, the diameter of said outer portion of the sleeve bore being slightly larger than the outer diameter of the tube to be connected to define a radially thin first annular space therebetween, the diameter of said inner reduced portion of the sleeve bore being substantially larger than the internal diameter of the tube to be connected, said sleeve having a frusto-conical inner end having sealing engagement with said surface of the body recess and a portion provided with a radial outer face for engtgement by the nut shoulder; and a ring of brazing material yieldingly retained in said outer portion of the sleeve bore adjacent said radial shoulder of the sleeve bore, the wire diameter of said ring being preselected to define a volume of said ring substantially equal to the sum of the volumes of said space, a second annular space axially outwardly of said radial shoulder of the sleeve having an axial length equal to the radial dimension of said first annular space, a first preselected concave annular fillet space at the axially outer end of said first space, and approximately 110% of the volume of a second preselected concave annular fillet space with said inner portion of the sleeve bore at the radially inner end of said second space and having a minimum inner diameter at least equal to the inner diameter of the tube to be connected, whereby when the tube end is inserted into said outer portion of the sleeve bore to abut the ring therein and heat is applied to liquify said ring, the ring material flows by capillarity to fill accurately said first annular space and allows the tube end to be moved into close juxtaposition with said radial shoulder of the sleeve to define said second annular space and said fillets, while precluding flow of the brazing material to within the bore of the tube to be connected.

2. The tube fitting of claim 1 wherein said ring is formed of resilient brazing material and yieldingly engages the sleeve in said outer portion of the sleeve bore to be retained therein.

References Cited by the Examiner

UNITED STATES PATENTS

| 2,033,122 | 3/36 | Cornell | 285—287 |
| 2,174,218 | 9/39 | Greene | 285—287 |
| 2,454,557 | 11/48 | Jacobson | 285—332 |

FOREIGN PATENTS 448,317   5/48   Canada.

OTHER REFERENCES

"Welding Handbook," Fourth Edition, Section 3, published in 1959 by the American Welding Society, 33 West 39th Street, New York 18, N.Y. Pages identified as Joint Design 46.7 (lines 3 to 6 inclusive) and 46.56/ Brazing (2nd and 5th paragraphs under the heading "Nondestructive Tests, Visual Examination").

CARL W. TOMLIN, *Primary Examiner.*